United States Patent [19]

Okamoto et al.

[11] Patent Number: 4,805,132
[45] Date of Patent: Feb. 14, 1989

[54] MACHINE TRANSLATION SYSTEM

[75] Inventors: Toshio Okamoto, Tokyo; Kimihito Takeda, Odawara, both of Japan

[73] Assignee: Kabushiki Kaisha Toshiba, Kawasaki, Japan

[21] Appl. No.: 898,017

[22] Filed: Aug. 19, 1986

[30] Foreign Application Priority Data

Aug. 22, 1985 [JP] Japan .................................. 60-184940

[51] Int. Cl.⁴ .............................................. G06F 15/38
[52] U.S. Cl. .................................... 364/900; 364/419; 340/716; 340/721
[58] Field of Search ... 364/200 MS File, 900 MS File, 364/419; 340/716, 717, 721, 709, 706, 720

[56] References Cited

U.S. PATENT DOCUMENTS

| 3,364,473 | 1/1968 | Reitz et al. | 364/900 |
| 4,250,560 | 2/1981 | Dethloff | 364/900 |
| 4,468,754 | 8/1984 | Asada et al. | 364/900 |
| 4,468,756 | 8/1984 | Chan | 364/900 |
| 4,502,128 | 2/1985 | Okajima et al. | 364/900 |
| 4,651,299 | 3/1987 | Miyazaki et al. | 364/900 |
| 4,656,603 | 4/1987 | Dunn | 364/900 |
| 4,685,060 | 8/1987 | Yamano et al. | 364/419 |

FOREIGN PATENT DOCUMENTS 0012777 7/1980 European Pat. Off. .
0081784 6/1983 European Pat. Off. .

OTHER PUBLICATIONS

Patent Abstracts of Japan, vol. 8, No. 117 (P-277) [1554], May 31, 1984 (Casio Keisanki K.K.).

Primary Examiner—Gareth D. Shaw
Assistant Examiner—Kevin A. Kriess
Attorney, Agent, or Firm—Oblon, Fisher, Spivak, McClelland & Maier

[57] ABSTRACT

A machine translation system has an input section, an original storage section for storing an original sentence input by the input section, a dictionary section storing linguistical information necessary for translation processing, a translation processing section for obtaining a translated sentence from the original sentence with reference to the linguistical information, a translation storage section for storing the translated sentence, a display section for displaying the original and translated sentences on predetermined display regions, respectively, and an edit processing section for performing edit processing for the original and translated sentences displayed on the display section. The edit processing section detects position information of information input by the input section, which indicates an input position on a display screen, and discriminates whether or not the position information corresponds to a predetermined new input region on which a newly input original sentence is displayed. When the position information corresponds to the new input region, the edit processing section stores the input original sentence in the original storage section.

6 Claims, 4 Drawing Sheets

MACHINE TRANSLATION SYSTEM

BACKGROUND OF THE INVENTION

The present invention relates to a machine translation system for processing an original sentence to obtain a translated sentence and, more particularly, to a machine translation system for simplifying an operation of an operator for translation processing.

In recent years, various machine translation systems for translation using a computer system have been developed, e.g., a processing system for translation English sentences to Japanese sentences or vice versa, and the like.

A basic processing operation in these systems will be briefly described.

Morphemes constituting an input original sentence or its sentence structure is analyzed to divide the original sentence into predetermined processing units, e.g., words (or phrases). A translation dictionary is referred to for each processing unit to obtain a translated word (or phrase) corresponding to the processing unit. The translated words (or translated phrases) are combined in accordance with a given translation rule, thus obtaining a translated sentence.

However, since a reliable technique for interpreting the meaning of a natural language has not yet been established, it is difficult to immediately obtain an appropriate translated sentence through the machine translation. More specifically, an English word "find", for example, has meanings "to discover by chance"; "to get by searching"; "to perceive"; "to recover (something lost)"; "to consider"; "to reach"; etc. When the word "find" is translated into Japanese, it has different translated words corresponding to the above meanings. In this manner, a single original word often has a plurality of translation possiblities. In this case, selection of a translated word possibility largely influences the translation quality from an original sentence into a translated sentence.

In a conventional system, a plurality of translation possibilities corresponding to each processing unit (original word) are displayed simultaneously or selectively so as to be presented to an operator, and the operator determines and selects an appropriate translated word to constitute a translated sentence.

However, even if a translated sentence is obtained in this manner, an inappropriate translated word often still remains in the translated sentence. The operator must correct the inappropriate translated word in the translated sentence through post-edit processing. Therefore, in the system of this type, an edit processing section (editer) for executing post processing, e.g., correction of a translated sentence, is normally provided.

When edit processing for the translated result is performed using the editer, the operation mode of the system is set in a translated-sentence edit mode for editing a translated sentence or in a translation/edit mode for translating an original sentence and editing the translated sentence. For this reason, during translation processing or translated-sentence edit porcessing, an original sentence cannot be input from an input section, e.g., a keyboard. When an original sentence is input from the input section, the translated-sectence edit mode or the translation/edit mode must be temporarily canceled and the original-sentence input mode must be set.

Therefore, this system has poor operability, and interferes with an efficient original-sentence input operation and translated-sentence edit operation.

SUMMARY OF THE INVENTION

It is an object of the present invention to provide a machine translation system which can effectively perform an original-sentence input operation and translated sentence edit operation.

In a machine translation system of the present invention, an original sentence input from an input section is stored in an original storage section, and is subjected to translation processing using linguistical information stored in a dictionary section. A translated sentence obtained through the translation processing is stored in a translation storage section. Then, the original and translated sentences are respectively displayed on predetermined display regions of a display section, and are subjected to edit processing in accordance with information supplied from the input section. In addition, the machine translation system detects an information input position of the information input from the input section on the display section, and discriminates from tbe input position whether the input information is a newly input original sentence. If the information is a newly input original sentence, the original sentence is stored in the original storage section. If it is discriminated that the information is not a newly input original sentence, translation/edit processing corresponding to the input information is performed.

According to the machine translation system of the present invention, it can be discriminated from an input position of information from an input section on a display section whether the input information corresponds to a newly input original sentence or information associated with translation/edit processing. If the input information is a newly input original sentence, it is sequentially stored in an original storage section. Therefore, a switching operation for operation modes of the system can be omitted, and an original sentence can be input even during translated-sentence edit processing. In addition, inputting of an original sentence and instruction for translation/edit processing can be selectively used upon control of an input position, i.e., a cursor position on the display section.

Therefore, an original input operation and an edit operation can be simplified, thus allowing easy and efficient machine translation.

DETAILED DESCRIPTION OF THE PREFERRED EMBODIMENT

Figure 1:
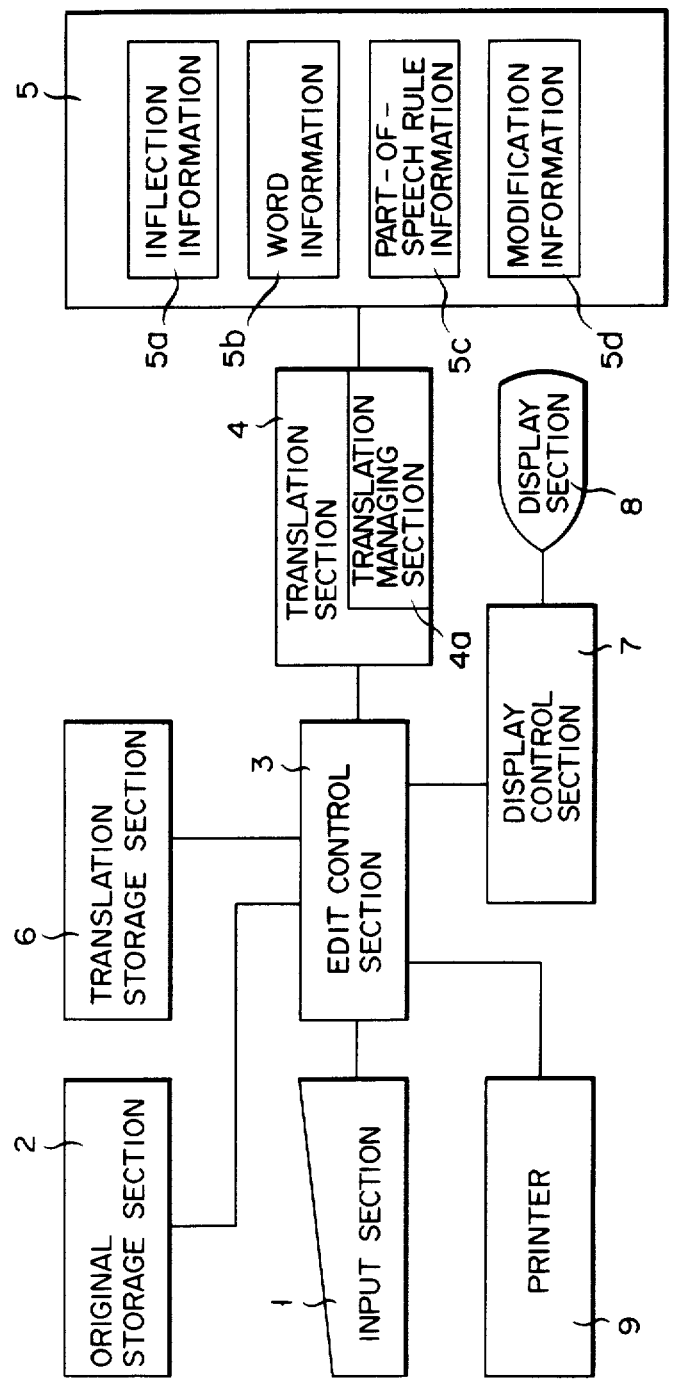
FIG. 1 is a schematic block diagram of a machine translation system according to an embodiment of the present invention.

FIG. 1 shows a machine translation system according to an embodiment of the present invention. In this embodiment, English sentences are input and are translated into Japanese sentences.

An English sentence input at input section 1 comprising a keyboard is stored in original storage section 2 as an original sentence to be translated.

Translation section 4 is operated under the control of edit control section 3. Translation section 4 refers to linguistical information necessary for translation processing prestored in dictionary section 5 to sequentially translate predetermined processing units of the original sentence stored in section 2.

Note that the linguistical information stored in dictionary section 5 includes, e.g., inflection (regular/irregular inflection) information 5a, word (translated word) information 5b, part-of-speech string rule (conjunction-impossible part-of-speech string) information 5c, modification information 5d for translated sentences. The original sentence is machine-translated with reference to the linguistical information to obtain a Japanese sentence. The translated setence is managed in accordance with the correspondence with respect to the original sentence and is stored in translation storage section 6.

Edit control section 3 drives display control section 7 so that English sentences stored in section 2 and Japanese sentences stored in section 6 are displayed at corresponding positions on the display screen. Then, the translated sentence is subjected to post-edit processing. The post-edit processing is executed in accordance with information input from input section 1. Upon execution of the post-edit processing, the linguistical information stored in dictionary section 5 is referred to if necessary.

The translated sentence (Japanese sentence) corresponding to the original sentence (English sentence), which is subjected to the post-edit processing, is printed by printer 9 and is output as a hard copy.

Figure 2:
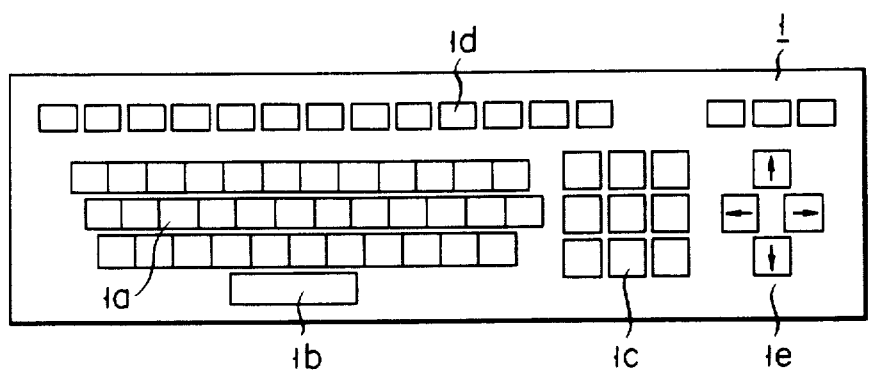
FIG. 2 is an illustration of a keyboard as an input section used in the system shown in FIG. 1.

FIG. 2 illustrates a keyboard constituting input section 1. The keyboard includes character data input key group 1a, translation instruction key 1b, edit key group 1c, function key group 1d, and cursor control key group 1e for controlling a cursor position on display section 8.

Figure 3:
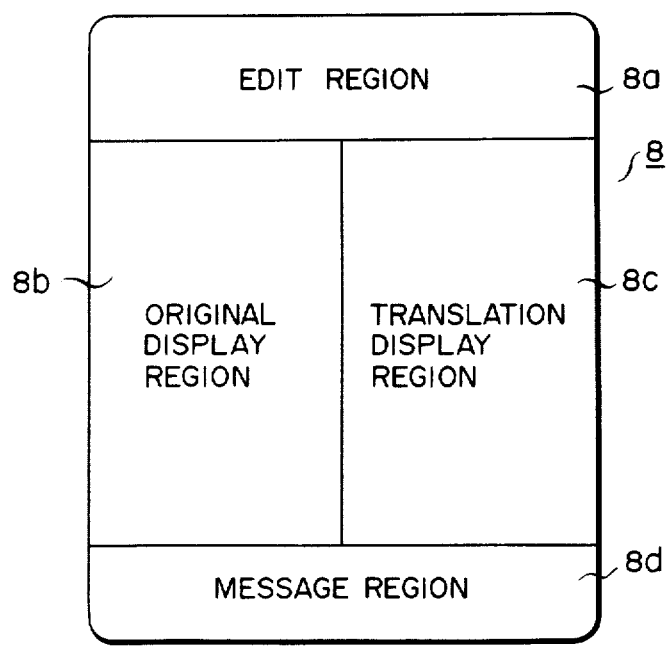
FIG. 3 is a display format for a display screen of a display section in the system shown in FIG. 1.

FIG. 3 shows a display screen format of original and translated sentences on display section 8. The display screen is divided into four regions, i.e., edit region 8a at the upper portion of the screen, original display region 8b at the left of the screen, translation display region 8c at the right of the screen, and message display region 8d at the lower portion of screen.

Original display region 8b displays input original sentences stored in storage section 2, and translation display region 8c displays translated sentences stored in storage section 6 to correspond to the original sentences on region 8b. Edit region 8a displays information necessary for translation processing, e.g., translated word possibilities subjected to translation processing from among linguistical information accessed from dictionary section 5. Message display region 8d displays a message indicating the progress of translation processing, as will be described later.

Figure 4:
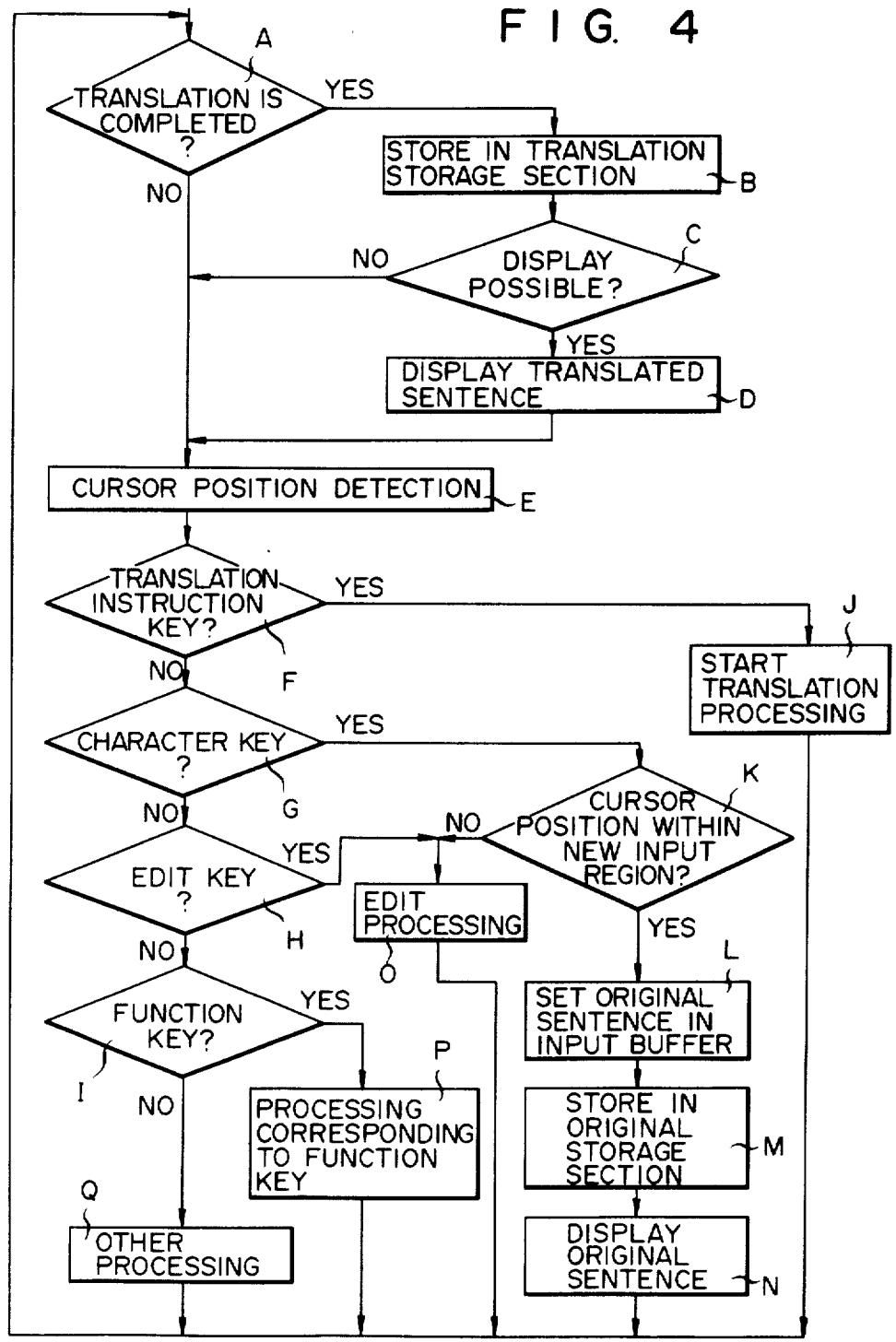
FIG. 4 is a flow chart showing a basic operation sequence of the system shown in FIG. 1.

FIG. 4 shows a basic operation sequence of the system with the above arrangement. Edit control section 3 discriminates translation end information from translation section 4 and various key information input from input section 1, and controls translation/edit processing in a conversational manner.

Edit control section 3 monitors translation processing in translation section 4 (step A). When section 3 detects completion of translation processing for one original sentence in translation section 4, it stores an obtained translated sentence in storage section 6 (step B). Section 3 checks if the translated sentence can be displayed (step C). If YES in step C, the translated sentence is displayed on display section 8 to correspond to its original sentence (step D).

If no translation end signal is supplied from translation section 4, or if the translated sentence cannot be displayed after completion of the translation processing, or after the translated sentence is displayed, section 3 detects a cursor position (step E). The cursor position detection result is also utilized to discriminate a display region of the display screen at which a character is input by a character key, as will be described later. Thereafter, section 3 discriminates key information input from input section 1 (steps F, G, H, and I). Section 3 controls the following processing in accordance with the input key discrimination result.

If the input key information is a "translation instruction key" (step F), edit control section 3 transfers an input original sentence stored in storage section 2 to translation section 4 and causes section 4 to start translation processing (step J).

Figure 5:
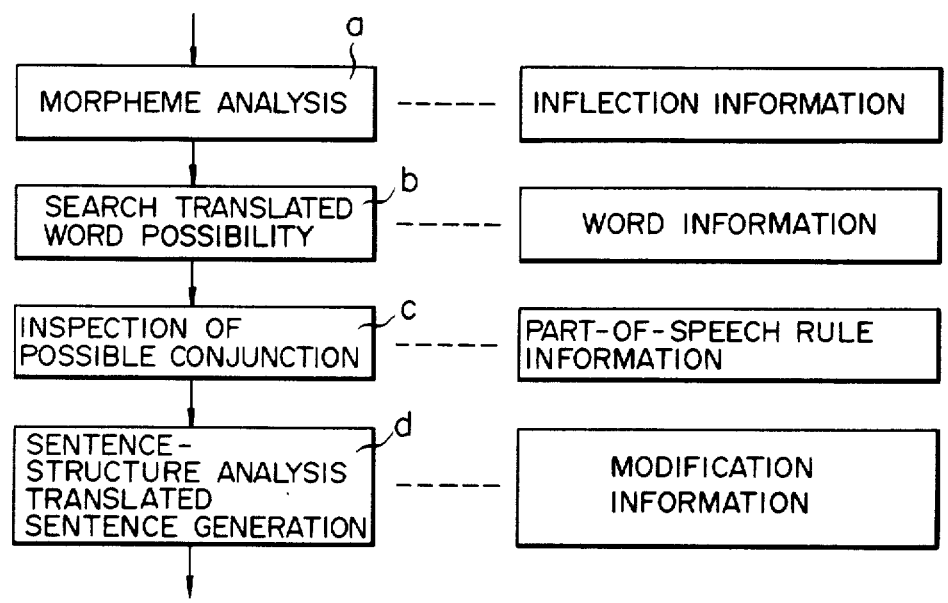
FIG. 5 is a detailed flow chart of a translation processing sequence in FIG. 4.

Translation processing is executed parallel to processing shown in FIG. 4. The processing shown in FIG. 4 controls the beginning of translation procssing and monitors its completion. As indicated by the processing sequence in FIG. 5, in the translation processing, a linguistical structure, e.g., regular/irregular inflection, of an original sentence to be translated is analyzed with reference to inflection information 5an stored in dictionary section 5 (step a). With this morpheme analysis, conjugated or inflected original words are converted to their original forms (fundamental forms). More specifically, a word expressed by the past tense or present continuous tense is converted to its present form, and a word expressed in the comparative degree or superlative degree is converted to its fundamental form.

Part-of-speech and translated word information of the original words of the morpheme analyzed original sentence are then obtained with reference to word information 5b (step b). This processing is performed by accessing word information 5b using the original words as keywords.

Possible conjunction of the translated-word possibility is inspected in accordance with information obtained by accessing dictionary section 5 (step c). This inspection is repetitively performed with reference to part-of-speech rule information 5c until the sentence-structure analysis result without contradiction is obtained. With this sentence-structure analysis, the arrangement of part-of-speechs of original words constituting the original sentence, modification relationship, the mode of tense, and the like are obtained.

Thereafter, the structure of the sentence-structure analyzed original sentence is converted to that of a translated sentence with reference to modification information 5d to generate the translated sentence constituted by translated word possibilities of the respective original words (step d). In this case, the translated possibilities are conjugated or inflected in accordance with the sentence-structure analysis result of the original sentence, thus obtaining an appropriate translated sentence.

With the above translation processing, the translated sentence corresponding to the original sentence can be obtained.

Referring again to FIG. 4, if the input key information is a "character key" (step G), the input position of the character information on the display screen is discriminated in accordance with the cursor position detection result in step E. If the cursor is located within original display region 8b and on a line different from the display line position of the already input and displayed original sentences, the input is discriminated as a new original sentence input (step K). In this case, character codes indicated by the input character keys are stored in an input buffer as input original sentence information (step L) and are also registered in original storage section 2 (step M), and character patterns corresponding to the character codes are displayed on display section 8 (step N). In this manner, the original sentence input from input section 1 is sequentially displayed.

In step K, if the cursor is located at another position, the input is determined as information input for translation/edit processing. In this case, the input information is used for edit processing executed upon operation of an "edit key" (step O).

If the input key information is a "function key" (step H), processing corresponding to the depressed function key is executed (step P). If there is no key input information or if the key input information is other than the above "key"s, other processing, e.g., hard copy output of a translated sentence stored in storage section 6 by means of printer 9 is performed.

When cursor moving key 1e of the keyboard is operated to adjust the cursor at an original-sentence input position of region 8b and character input key group 1a is operated to input characters, the character information is sequentially set in the input buffer by the control operation of edit control section 3 according to the above sequence, and is stored in storage section 2 as an original sentence to be translated (steps G, K, L, and M). The input original sentence is displayed on region 8b of display section 8 (step N). The input operation of an original sentence is allowed upon control of the cursor position regardless of the operation mode of the system.

When translation instruction key 1b is operated at an arbitrary time during a character input operation, e.g., when inputting of a sentence ends, the translation processing for the input original sentence stored in the input buffer starts in accordance with the key input information (steps F and J). After completion of the translation processing, the translated sentence is displayed on region 8c of display section 8 (steps A, B, C, and D).

Figure 6:
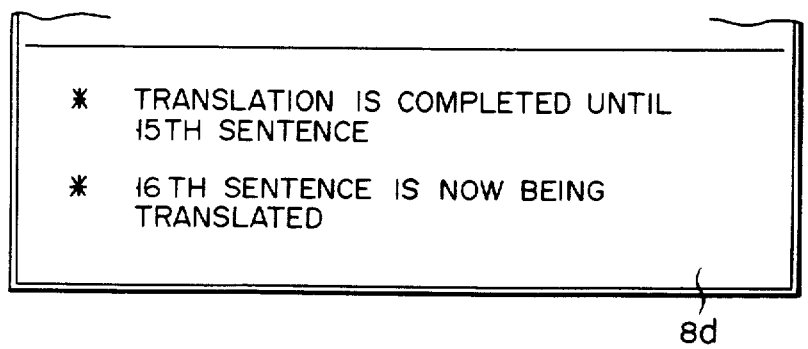
FIG. 6 is a representation showing message display in the system shown in FIG. 1.

At this time, a message indicating the progress of the translation processing, e.g., "*Translation is completed until 15th sentence" or "*16th sentence is now being translated", is displayed on region 8d, as shown in FIG. 6, in accordance with managing information from translation managing section 4a incorporated in translation section 4 shown in FIG. 1. This processing is executed as one of the other processing in step Q in FIG. 4.

The input operation of original sentences is controlled in accordance with such message display. For example, when a number of original sentences to be translated are stored in storage section 2, correction processing for the translated sentence can be performed for a time period until the translation processing for the original sentences is completed. When the number of remaining original sentences to be translated is decreased, translation/edit processing is interrupted and an original-sentence input operation is enabled.

When an input original sentence must be edited, e.g., corrected, cursor control key group 1e is operated during the original-sentence input operation upon operation of character input key group 1a, the cursor is moved to a position to be corrected, more specifically, a word or clause in the displayed original sentence, and edit key group 1c, e.g., correction, insert, delete keys, and the like, is operated to execute the edit processing (steps G and H). In other words, the cursor is moved from the original-sentence input position to another position, and information is input to execute the edit processing.

Edit processing for original and translated sentences upon operation of the edit keys will be briefly described.

The edit processing for original and translated sentences is realized such that processing corresponding to the depressed edit key is performed with respect to a word (original word, original phrase, translated word, or translated phrase) indicated by the cursor on the screen of display section 8. Detailed edit processing is as follows:

(1) Upon operation of an insert key, a character is inserted in front of the cursor position.

(2) Upon operation of a delete key, a character string within a range indicated by the cursor is deleted.

(3) Upon operation of a move key, a character string within a ranged indicated by the cursor is moved.

(4) Upon operation of a cancel key, edit functions selected by the corresponding keys are made invalid.

(5) Upon operation of a modification key, another modification possibility of a word or phrase indicated by the cursor is displayed.

When the above function keys are operated, the following functions can be realized and are used for the translation/edit processing.

(1) Upon operation of a translated-word display key, a translated-word possibility for a word in a translated sentence indicated by the cursor is displayed.

(2) Upon operation of a dictionary display key, the content of the translation dictionary is displayed using a word in the original sentence indicated by the cursor as a keyword.

(3) Upon operation of a dictionary registration key, a character string indicated by the cursor is registered in dictionary section 5 as a new word or phrase.

(4) Upon operation of a dictionary delete key, the new word or phrase registered in dictionary section 5 is cleared.

(5) Upon operation of a partial translation key, a partial translation of an original sentence, which is indicated by the cursor and has not been successfully translated, is displayed.

Note that indication of a character string (word) by means of the cursor is performed while moving the cursor on the display screen using the cursor moving keys and varying a cursor size (e.g., enlarging or reducing it on the screen) by the cursor control key.

Upon use of the above function, post processing, e.g., correction of translated words, for the translated sentence is performed in a conversational manner.

According to the system of the present invention, when character information is input from input section 1, translation/edit processing for a translated sentence can be performed by character information input position control through cursor position control. Even during the translation/edit processing, an original sentence can be input and stored in storage section 2.

Therefore, an original sentence can be input and translation/edit processing can be executed in accordance with the progress of translation/edit processing without switching the operation mode of the system. In addition, an information input operation can be easily controlled in accordance with displayed messages. For this reason, an original-sentence input operation and an edit operation for the translated result can be easily and efficiently performed, thus greatly reducing a load on an operator.

The present invention is not limited to the above embodiment.

In the above embodiment, for example, translation/edit processing is performed in units of words as processing units, but can be performed in units of phrases or clauses.

The system of the present invention can have means for collectively inputting original sentences from a large-capacity storage device or a communication line, in addition to an original-sentence input from input section 1.

In addition, a display control mode of messages or kinds of message are not limited to those described above.

Various other changes and modifications may be made within the spirit and scope of the invention.

What is claimed is:

1. A machine translation system comprising: input means for inputting at least character string information and control information; original storage means for storing an original sentence consisting of the character string information input by said input means, said original storage means including a new input buffer for temporarily storing a new input; dictionary means for storing linguistical information necessary for translation processing of the original sentence; translation processing means for obtaining a translated sentence consisting of character string information from the original sentence stored in said original storage means with reference to the linguistical information stored in said dictionary means; translation storage means for storing the translated sentence; display means for displaying the original and translated sentences at predetermined display regions, respectively; and edit processing means for performing edit processing for the original and translation displayed on said display means in accordance with information input by said input means, said edit processing means including:

position detecting means for detecting position information substantially representing an input position of information input by said input means on a display screen of said display means;

region discriminating means for discriminating whether or not the position information corresponds to a predetermined new input region which is within the region of the display screen of said display means where the original sentence is to be displayed and which is not used for displaying any character;

storage control means for storing the information input by said input means in the new input buffer of said original storage means when the position information corresponds to the new input region; and editing means for editing the original sentence or the translated sentence displayed by said display means in the display region designated by the position information, when said position information corresponds to an input region other than the predetermined new input region.

2. A system according to claim 1, wherein said display means has a display screen on which a cursor is moved to a position where input data will be displayed, and said detecting means detects the position of the cursor on the display screen.

3. A system according to claim 1, wherein said region discriminating means comprises means for discriminating, as the new input region, a region which is within the region of the display screen of said display means where the original sentence is to be displayed and which excludes a line or lines where the original sentence has already been input.

4. A system according to claim 1, wherein said display means includes means for displaying the original and translated sentences on original and translation display regions on the display screen, respectively.

5. A system according to claim 1, further comprising means for displaying information indicating the progress of translation processing by said translation processing means on a predetermined region of said display means.

6. A machine translation system comprising:

input means for inputting at least character string information and control information;

original storage means for storing an original sentence consisting of the character string information input by said input means;

dictionary means for storing linguistical information necessary for translation processing of the original sentence;

translation processing means for obtaining a translated sentence consisting of character string information from the original sentence stored in said original storage means with reference to the linguistical information stored in said dictionary means;

translation storage means for storing the translated sentence;

display means for displaying the original and translated sentences at predetermined display regions, respectively; and edit processing means, which includes: (a) position detecting means for detecting position information substantially representing an input position of information input by said input means on a display screen of said display means; (b) region discriminating means for discriminating whether or not the position information corresponds to a predetermined new input region which is within the region where the original sentence is to be displayed and which is not used for displaying the original sentence already input and (c) storage control means for storing the information sentence input by said input means in said original storage means when the position information corresponds to the new input region.

* * * * *